United States Patent [19]

Biondetti

[11] Patent Number: 4,501,662
[45] Date of Patent: Feb. 26, 1985

[54] WIRE MACHINE, FOR DEWATERING STOCK SUSPENSIONS

[75] Inventor: Mario Biondetti, Schio, Italy

[73] Assignee: Escher Wyss GmbH, Ravensburg/Württ., Fed. Rep. of Germany

[21] Appl. No.: 380,940

[22] Filed: May 21, 1982

[30] Foreign Application Priority Data

Jun. 3, 1981 [CH] Switzerland .......................... 3617/81

[51] Int. Cl.³ .......................... D21C 9/12; D21F 1/78; D21F 1/80
[52] U.S. Cl. .......................... 210/391; 8/156; 68/22 R; 68/45; 162/55; 162/56; 162/318; 210/396; 210/401
[58] Field of Search ............... 162/203, 318, 297, 217, 162/290, 299, 306, 302, 363, 300; 210/400, 401, 391, 396, 783; 68/45, 22 R; 8/156

[56] References Cited

U.S. PATENT DOCUMENTS

| | | | |
|---|---|---|---|
| 3,056,719 | 11/1962 | Webster | 162/203 |
| 3,089,596 | 5/1963 | O'Brien et al. | 210/400 |
| 3,844,881 | 10/1974 | Moody | 162/297 |
| 3,856,618 | 12/1974 | Ruell | 162/300 |
| 4,354,902 | 10/1982 | Attwood | 162/300 |

*Primary Examiner*—Steve Alvo
*Attorney, Agent, or Firm*—Werner W. Kleeman

[57] ABSTRACT

A wire machine, especially for washing stock suspensions, contains one or a number of dewatering cylinders about which there is trained an endless wire or filter band. There is provided at least one stock infeed device which infeeds a substantially flat jet of the suspension which is to be dewatered into a substantially wedge-shaped space or throat located between the wire band and the dewatering cylinder. The dewatering cylinder has a longitudinal axis which is essentially vertically arranged. There are possible different arrangements of the dewatering cylinder or cylinders, the stock infeed devices and material removal devices for removing from the rotatable dewatering cylinder solid constituents or the like contained in the stock suspension. Also there are possible different arrangements and uses of guide rolls for guiding the wire or wire band.

9 Claims, 11 Drawing Figures

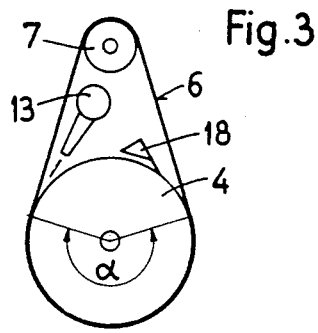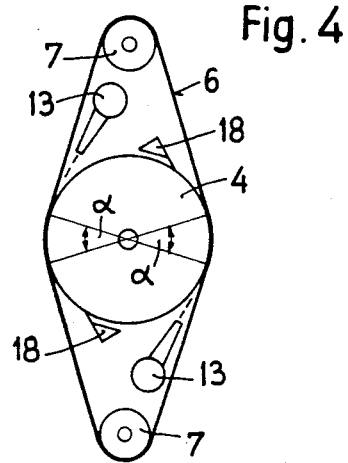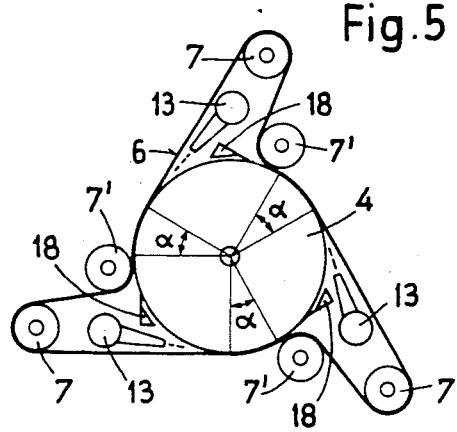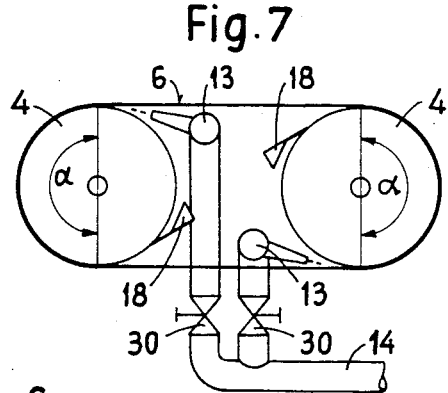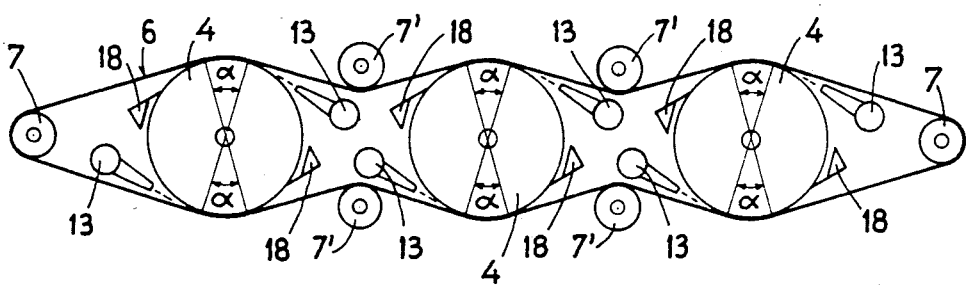

4,501,662

WIRE MACHINE, FOR DEWATERING STOCK SUSPENSIONS

CROSS-REFERENCE TO RELATED APPLICATION

This application is related to the commonly assigned, copending U.S. application Ser. No. 06/226,200, filed Jan. 19, 1981, now abandoned.

BACKGROUND OF THE INVENTION

The present invention relates to a new and improved construction of a wire or filter machine, especially suitable for washing stock suspensions.

Generally speaking, the wire or filter machine of the present development is of the type containing at least one rotatable dewatering cylinder about which there is trained or wrapped at least one endless revolving wire or filter band, sometimes simply referred to herein as a wire. The stock material which is to be dewatered is introduced in the form of a flat stock jet from a stock infeed device into a substantially wedge-shaped space or throat located between the wire and the dewatering cylinder. Additionally, there is provided a solid material-removal device for the detachment of dewatered material from the surface of the dewatering cylinder.

A wire machine of this general type has been disclosed in the aforementioned previously copending U.S. application Ser. No. 06/226,200 now abandoned. This proposed wire machine affords a rapid dewatering or dehydration of doughy or sludgey materials, such as, for instance, fiber stock suspensions used for the fabrication of paper. It also can be advantageously employed as a washing device for fiber stock which has been reclaimed from waste paper.

SUMMARY OF THE INVENTION

It is a primary object of the present invention to improve upon such proposed wire machine, and specifically with the intent of increasing by a multiple the output of such wire machine while simultaneously simplifying its construction.

A further significant object of the present invention is directed to a new and improved construction of a wire machine which is extremely reliable and efficient in dewatering various stock suspensions or the like, and can be effectively employed for the washing of such stock suspensions.

Yet a further significant object of the present invention is directed to a new and improved construction of wire machine which is relatively simple in construction and design, quite economical to manufacture, highly reliable in operation, not readily subject to breakdown or malfunction, and requires a minimum of maintenance and servicing.

Now in order to implement these and still further objects of the invention, which will become more readily apparent as the description proceeds, the wire machine of the present development is manifested by the features that, the dewatering cylinder has a longitudinal axis which is essentially vertically arranged, and the wire along with its wire surface likewise is essentially vertically arranged. The detached dewatered material can be downwardly removed, under the action of the force of gravity, out of the region of the wire and the dewatering cylinder.

By virtue of the inventive measures there is obtained a rapid and unproblematic removal of the pressed-out material, for instance fiber materials, out of the region of the wire and the dewatering cylinder. Additionally, there are possible different constructions of the wire machine for obtaining the desired effect.

Thus, for instance, the dewatering cylinder can have operatively correlated therewith a plurality of infeed devices and corresponding removal devices. Such type of arrangement, which automatically results in a multiplication of the output of the wire machine, would not have been possible with the previously proposed construction of wire machine, since difficulties would have arisen with the removal of the dewatered material from the region of the wire.

It is also possible to construct the wire machine in a manner such that it contains a plurality of dewatering cylinders. Each of such dewatering cylinders—sometimes simply referred to as cylinders—has operatively associated therewith an infeed device and a removal device. Also in this manner it is possible to increase by a multiple the output of the wire machine with a minimum expenditure in additional equipment.

When there is used a plurality of stock infeed devices or infeed means such preferably should be capable of being turned-on and turned-off separately and independently of one another. With these measures there is obtained a simple possibility for regulating the output of the wire machine, without for instance the velocity of the flat stock jet of the suspension which is to be dewatered having to depart from a favorable range.

As to specific embodiments of the wire machine, there can be provided, for instance, a single wire which forms an endless wire loop. This single wire or wire band then bears at its inner wire surface at the cylinder or cylinders, as the case may be. Moreover, the infeed device as well as the removal device, or again as the case may be, the infeed devices and the removal devices, can be located within the wire loop.

According to a simplified embodiment of the wire machine there can be provided a single cylinder which, in conjunction with at least one stock infeed device and a corresponding removal device, can be located within the wire loop of a single wire. Additionally, this wire can be guided over at least one guide roll. With this equipment design, while there is obtained only the same output as with the aforementioned previously proposed wire machine, nonetheless such is accomplished with appreciably simpler means.

In accordance with a further construction of the wire machine there can be provided at least two cylinders which are located within the wire loop of a common wire and are arranged in a row or in a line. The wire is additionally guided over guide rolls. As to these guide rolls two respective ones thereof are arranged between the cylinders and one respective guide roll is arranged at each end of the row or line of cylinders. Each cylinder has operatively associated therewith two infeed devices and two removal devices. This still extremely simple construction of wire machine can attain a multiple of the output of the prior proposed wire machine.

According to a further particularly simple modification of a wire machine of this type there can be provided two cylinders which are located within the wire loop of the common wire. At the region between the cylinders there are arranged two infeed devices and two removal devices.

A very simple embodiment of wire machine can contain at least three cylinders which are located externally of a row, i.e. not in a linear array. As to these three cylinders a single common wire is trained about all of these cylinders. At the respective region between the cylinders there are arranged the infeed devices and removal devices, and a respective one of such infeed devices and removal devices is operatively correlated with each cylinder.

In accordance with a further embodiment of the wire machine there can be provided at least three cylinders which are partially wrapped by the same common wire. Some of the cylinders are located within the wire loop and a further portion or others thereof externally of the wire loop.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various embodiments there have been generally used the same reference numerals to denote the same or analogous components, and wherein:

FIGS. 3 to 11 each respectively schematically depict in top plan view different further possibilities of arranging the cylinders and related structure for various modified constructions of the wire machine.

DETAILED DESCRIPTION OF THE PREFERRED EMBODIMENTS

Figure 1:
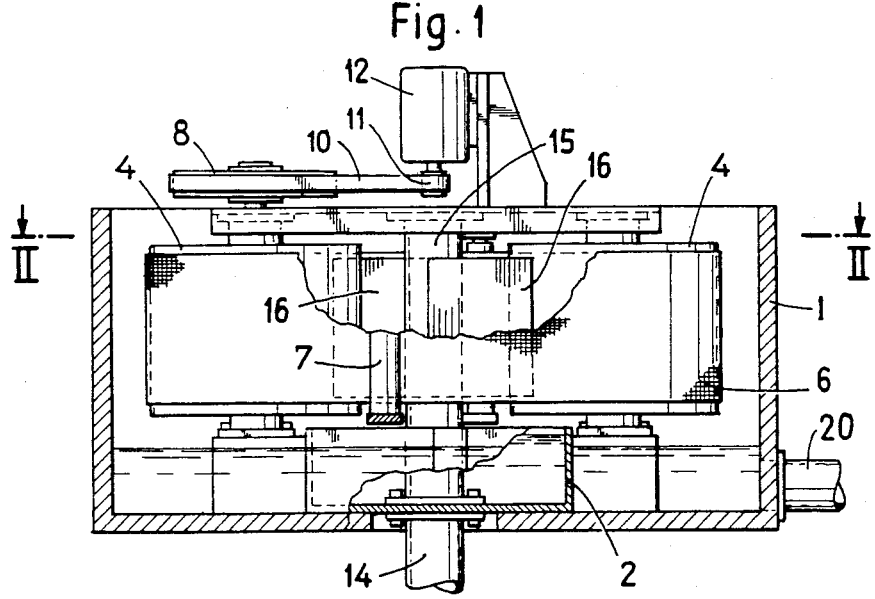
FIG. 1 schematically illustrates a simple construction of inventive wire machine in sectional view and in partial front elevational view.

Describing now the drawings, it is to be understood that only enough of the construction of the various embodiments of wire machines has been shown in the drawings to enable those skilled in this art to readily understand the underlying principles and concepts of the present development, while simplifying the illustration of the drawings. Turning attention now specifically to FIGS. 1 and 2, the exemplary embodiment of wire machine depicted therein will be seen to contain an outer container or receptacle 1 within which there is located an inner container or receptacle 2. Within the outer container 1 there are mounted two dewatering cylinders 4, each having a solid outer surface 5, upon a related essentially vertically extending shaft 3. Guided over the rotatable dewatering cylinders 4 is a common endless wire or filter 6—sometimes referred to as a wire band—which defines a wire loop. Apart from being guided over the two rotatable cylinders 4 this wire 6 is also guided over two guide rolls 7. One of these guide rolls 7 can be constructed in conventional manner to form a tensioning roll for tensioning the wire 6 and the other guide roll 7 can be structured as a regulation roll, by means of which the wire 6 can be retained along its desired path of travel, and thus, precludes any undesired sliding-off of the wire 6 from the rotatable dewatering cylinders 4. Such type of tensioning rolls and regulating rolls are well known in the papermaking machinery art, and thus, need not here be further described, particularly since details thereof do not constitute subject matter of the present invention.

As will be further seen by referring to FIG. 1, one of the rotatable cylinders 4 is provided with a belt pulley 8 or equivalent structure which is operatively connected by means of a pulley belt 10 or equivalent structure with a belt pulley 11 of a suitable drive motor 12 which is appropriately attached to and supported by the outer container 1.

Figure 2:
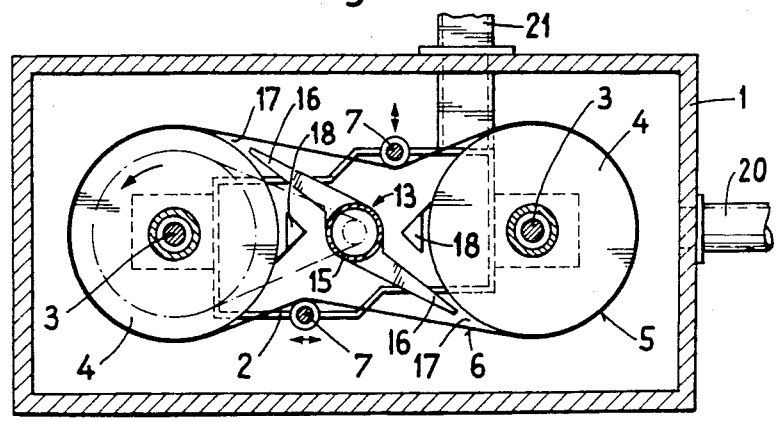
FIG. 2 is a cross-sectional view of the wire machine depicted in FIG. 1, taken substantially along the line II—II thereof.

As will be recognized by reverting to FIG. 2, which as will be recalled constitutes a sectional view of the arrangement of FIG. 1, taken substantially along the section line II—II thereof and is a top plan view of such arrangement of FIG. 1, a stock infeed device 13 for the material or stock which is to be dewatered is located between the rotatable dewatering cylinders 4. This stock infeed device 13 is operatively connected in flow communication with a supply conduit or line 14, as best seen by referring to FIG. 1. The infeed device 13 contains two nozzles or nozzle members 16 connected with a common central pipe or conduit 15 communicating with the supply line 14. These nozzles 16 each serve to form a substantially flat liquid or stock jet which is directed into the corresponding substantially wedge-shaped intermediate space or throat 17 formed between the wire 6 and the related rotatable dewatering cylinder 4. Additionally, each such cylinder 4 is provided with a material removal device 18 which, in the embodiment under discussion, possesses the shape of a scraper or doctor blade, one respective edge of which is suitably structured for scraping the outer surface 5 of the related dewatering cylinder 4. Such type of scrapers or blades are likewise well known from the papermaking machinery art.

During operation, and in a manner comparable to the prior proposed wire machine of the aforementioned previously copending application, a respective flat stock jet of the suspension which is to be dewatered is formed by the spray nozzles 16 of the infeed device 13. Each such flat stock jet is directed between the wire 6 and the outer surface 5 of the corresponding dewatering cylinder 4. The water which is expelled out of the suspension is propelled outwardly through the foraminous wire 6 and settles in the outer container 1. The solid constituents or the like contained in the stock suspension, for instance fiber materials for fabricating paper, remain adhering to the outer surface 5 of each rotatable cylinder 4 with which they come into contact, and specifically, also following the off-travel of the wire 6 from the corresponding cylinder outer surface 5. Thereafter, such adhering solids are detached from the outer surface 5 of each dewatering cylinder 4 by the action of the related removal device 18 which, as will be recalled, here constitutes in the embodiment under discussion a respective scraper or equivalent structure. The removed dewatered material then drops downwardly under the action of the force of gravity into the inner container 2, and therefore, in this manner comes out of the effective region of the wire 6 and the dewatering cylinders 4. The expressed water flows out of container 1 through a connection or discharge 20 or the like. The dewatered material is removed from the inner container 2 by a removal line or conduit 21, as best seen by referring to FIG. 2.

The wire machine depicted in FIGS. 1 and 2 has essentially twice the output of the previously proposed machine while possessing a simpler construction and design of the equipment. Under circumstances, with the wire machine of FIGS. 1 and 2, it would be possible to even dispense with the use of the guide rolls 7 if it can be assured that the wire 6 can be retained along its desired path of travel by resorting to the aid of other measures or facilities effective for this purpose, for instance by doming or crowning the outer surfaces 5 of the dewatering cylinders 4.

As will be recalled, in FIG. 2 the material removal devices 18 have been shown, by way of example and not limitation, as scrapers. However, they can be replaced by other appropriate material removal means. If, for instance, the wire machine is used for washing fiber material which is reclaimed from waste paper, and for instance from which there should be removed ash materials, then the scrapers or doctor blades 18 can be replaced by spray nozzles for spraying water. The water then serves for wetting or moistening the dewatered fiber stock and for its transport out of the container 2, whereas the fine materials or ash materials, as the case may be, which should be removed along with the contaminated water, can flow out of the container 1.

FIGS. 3 to 11 respectively depict different possibilities of arranging the cylinder or cylinders, the wire, the infeed devices and the removal devices.

Turning attention specifically to FIG. 3, which illustrates one of the simplest possible constructions of apparatus, there will be seen a single dewatering cylinder 4 having a substantially vertical longitudinal axis. Over the dewatering cylinder 4 there is guided an endless wire 6 which also wraps about a guide roll 7. Just as was the case for the arrangement of FIGS. 1 and 2, here also the wire 6 bears by means of its not particularly referenced inner wire surface of the wire loop upon the dewatering cylinder 4 and also upon the guide roll 7. In the intermediate space or region between the cylinder 4 and the guide roll 7 there are located the infeed device 13 and removal device 18. In the case of this particularly simple construction of wire machine it is possible to dome or crown the guide roll 7 for the purpose of guiding the wire 6, so that, similar to the case of a pulley belt, the wire 6 is prevented from sliding-off the rotatable dewatering cylinder 4.

FIG. 4 illustrates a wire machine which differs from the construction of wire machine depicted in the embodiment of FIG. 3 in that, in this case there is provided a second guide roll 7 along with a further infeed device 13 and a further removal device 18. The wire machine of FIG. 4, through the addition of quite simple means, possesses approximately twice the output of the wire machine of the arrangement of FIG. 3.

Continuing, the further embodiment of wire machine as shown in FIG. 5 likewise contains a single rotatable dewatering cylinder 4. Here there is additionally provided a third guide roll 7. To obtain an adequate wrap angle α of the wire 6 at the dewatering cylinder 4 there are provided the external guide rolls 7'. The wire machine of the arrangement of FIG. 5 is provided with three stock infeed devices 13 and three material removal devices 18. This wire machine therefore possesses approximately three-times the output of the wire machine construction of FIG. 3.

FIGS. 6 to 11 respectively illustrate additional exemplary embodiments of inventive wire machines, wherein in each instance there are provided a plurality of dewatering cylinders 4. Thus, in the arrangement of FIG. 6 there is depicted a wire machine which possesses three cylinders 4 which are located in a row or in an in-line configuration. However, this row of cylinders 4 also can be expanded upon to include four or more cylinders or can only contain two cylinders. As previously mentioned, the parts or components of the wire machine arrangement of FIG. 6 have been generally conveniently designated with the same reference characters to denote the same or analogous components as used for the constructions of wire machines depicted in FIGS. 3, 4 and 5 respectively, so that any further discussion thereof would appear to be unnecessary.

As to the embodiment of wire machine shown in FIG. 7 it is to be remarked that it essentially corresponds to the construction of wire machine depicted and disclosed previously with regard to FIGS. 1 and 2. However, in this case the guide rolls 7 are omitted. On the other hand, the central stock infeed device 13 depicted in the arrangement of FIGS. 1 and 2, is here replaced by two separate stock infeed devices 13 which can be connected to a common infeed line or supply conduit 14 by means of appropriate shut-off elements 30, typically for instance suitable shut-off valves. By virture of this equipment design it is possible to infinitely regulate the output of the wire machine by selectively switching-off or switching-on one of the infeed devices 13. It should be understood that these measures or facilities also can be used with all of the other constructions of wire machines.

Figure 8:
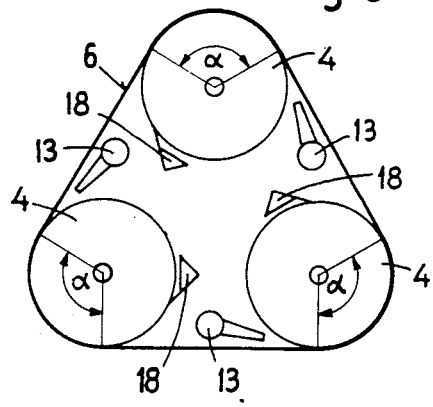

FIG. 8 depicts a wire machine containing three dewatering cylinders 4 which are not located in a row or line, and specifically, are arranged so-to-speak out-of-line so as to form a substantially triangular configuration of cylinders 4. If there were used four such cylinders 4 then there would be formed by these four cylinders a quadratic or square configuration. Each of the cylinders 4 is again operatively associated with a stock infeed device 13 and a material removal device 18 for removing the solid materials or the like adhering to the cylinders.

Figure 10:
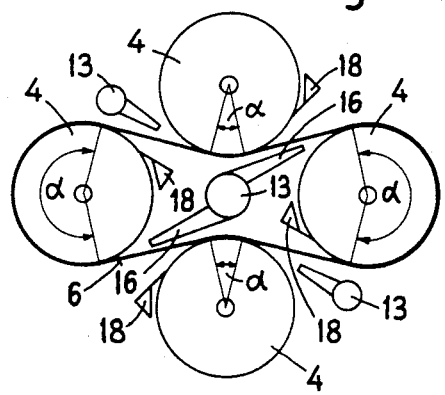
Figure 9:
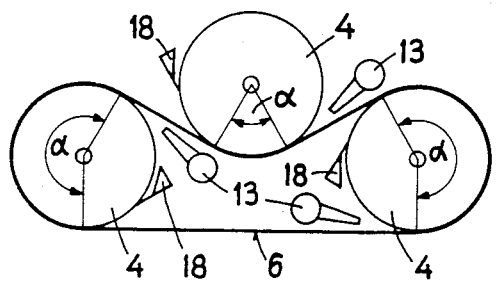
Figure 11:
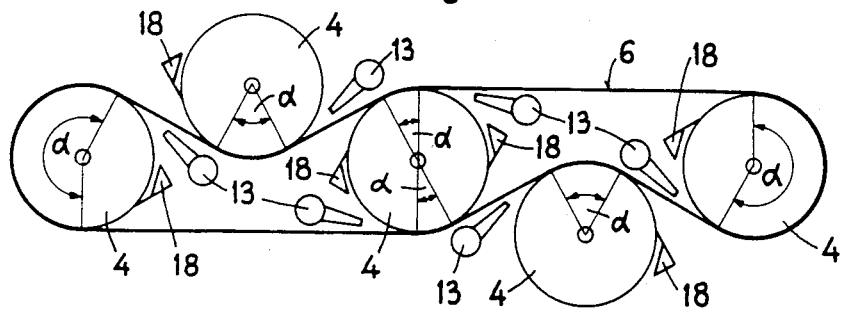

Finally, in each of FIGS. 9, 10 and 11 there is shown a respective embodiments of wire machine wherein some of the cylinders 4 are located within the wire loop of the wire 6 and the remainder of such cylinders 4 externally of such wire loop.

Specifically, in FIG. 9 there are provided three dewatering cylinders 4, two of which are located within the wire loop of the endless wire 6. The intermediate dewatering cylinder 4 presses from the outside against the wire 6. Also in this case each cylinder 4 has operatively associated therewith a stock infeed device 13 and a material removal device 18.

With the wire machine shown in FIG. 10, two cylinders 4 are arranged within the wire loop of the wire 6 and two cylinders 4 are located externally of such wire loop. With this machine design both of the infeed devices 13, which are located within the loop of the wire 6, corresponding to the arrangement of FIG. 2, can be grouped together into a single infeed device 13 containing two nozzles 16 or equivalent structure, as shown. This constitutes a simplification of the wire machine, however while simultaneously encountering a loss in the corresponding regulation stage.

The wire machine of FIG. 11 corresponds essentially to the wire machine of FIG. 9, but here however such has three inner cylinders 4 and two outer cylinders 4.

As already explained, the inventive wire machines can be beneficially used as washing devices for fiber stock reclaimed from waste paper. There is possible a multi-stage operational mode in that the dewatered material is admixed with clean water and again dewatered. For this purpose there can be arranged in succession a number of the inventive wire machines. However, it is also possible to resort to an operational mode wherein the material effluxing from one nozzle 13 is withdrawn following the dewatering thereof and then admixed with water, whereupon it is again infed to the other nozzle 13 of the same wire machine.

While there are shown and described present preferred embodiments of the invention, it is to be distinctly understood that the invention is not limited thereto, but may be otherwise variously embodied and practiced within the scope of the following claims. Accordingly,

What I claim is:

1. A wire machine for dewatering stock suspensions, comprising:
   at least two dewatering cylinders;
   an endless revolving wire defining an endless wire loop;
   said at least two dewatering cylinders being located within said endless wire loop;
   said dewatering cylinders and said wire coacting with one another so as to form therebetween substantially wedge-shaped spaces;
   at least one infeed device located within said wire loop for infeeding a respective substantially flat stock jet of the material which is to be dewatered into each of said substantially wedge-shaped spaces between said wire and said dewatering cylinders;
   at least one removal device operatively associated and cooperating with each dewatering cylinder and serving for the removal of dewatered material adhering to the surface of the associated dewatering cylinder;
   each said dewatering cylinder having a lengthwise axis which is substantially vertically arranged;
   said wire having a wire surface which is likewise substantially vertically arranged;
   the dewatered material removed by said removal devices being removed under the action of the force of gravity downwardly out of the region of the wire and said dewatering cylinders; and
   said wire defining a common wire training about said two dewatering cylinders and forming said endless wire loop.

2. The wire machine as defined in claim 1, wherein:
   only a single wire is provided which forms said endless wire loop;
   said endless wire loop bears by means of said wire surface, which defines an inner wire surface, upon each of said dewatering cylinders; and
   each said removal device being located within said endless wire loop adjacent to its associated dewatering cylinder.

3. The wire machine as defined in claim 1, further including:
   means for tensioning said at least one endless revolving wire about said surface of the dewatering cylinders to exert a force between the surface of the dewatering cylinders and said endless revolving wire and upon said flat stock jets of the material to be dewatered in order to force out water contained in such material to be dewatered.

4. A wire machine for dewatering stock suspensions, comprising:
   at least two dewatering cylinders;
   an endless revolving wire;
   said dewatering cylinders and said wire coacting with one another so as to form therebetween substantially wedge-shaped spaces;
   at least two infeed devices operatively associated with each dewatering cylinder;
   each of said infeed devices infeeding a substantially flat stock jet of the material which is to be dewatered into a respective one of said substantially wedge-shaped spaces between said wire and said dewatering cylinders;
   at least two removal devices operatively associated with each dewatering cylinder;
   each of said removal devices serving for the removal of dewatered material adhering to the surface of the dewatering cylinder with which such removal device is operatively associated;
   each said dewatering cylinder having a lengthwise axis which is substantially vertically arranged;
   said wire having a wire surface which is likewise substantially vertically arranged;
   the dewatered material removed by said removal devices being removed under the action of the force of gravity downwardly out of the region of the wire and said dewatering cylinders;
   said wire defining a common wire training about said at least two dewatering cylinders and forming a wire loop;
   said two dewatering cylinders being located within the wire loop of said common wire and being located essentially in a row;
   guide rolls for additionally guiding said wire; and
   said guide rolls defining two guide rolls located between said at least two dewatering cylinders and a respective further guide roll each arranged at an end of said row of said dewatering cylinders.

5. A wire machine for dewatering stock suspensions, comprising:
   at least two dewatering cylinders;
   an endless revolving wire;
   said dewatering cylinders and said wire coacting with one another so as to form therebetween substantially wedge-shaped spaces;
   at least one infeed device operatively associated with each of said two dewatering cylinders;
   each of said infeed devices infeeding a substantially flat stock jet of the material which is to be dewatered into the substantially wedge-shaped space between said wire and said dewatering cylinder with which said infeed device is operatively associated;
   at least one removal device operatively associated with each of said two dewatering cylinders;
   each of said removal devices removing dewatered material adhering to the surface of the dewatering cylinder with which it is operatively associated;
   each said dewatering cylinder having a lengthwise axis which is substantially vertically arranged;
   said wire having a wire surface which is likewise substantially vertically arranged;
   the dewatered material removed by each said removal device being removed under the action of the force of gravity downwardly out of the region of the wire and said dewatering cylinder with which said removal device is operatively associated;
   said wire defining a common wire training about said two dewatering cylinders and forming a wire loop; and
   said two dewatering cylinders being located within the wire loop of the common wire.

6. The wire machine as defined in claim 5, wherein:
   at least three of said dewatering cylinders are provided;

said at least three dewatering cylinders being located out-of-line;

said infeed devices and removal devices being arranged at predetermined regions between said dewatering cylinders; and a respective one of said infeed devices and removal devices being operatively associated with each dewatering cylinder.

7. The wire machine as defined in claim 5 wherein:

at least three of said dewatering cylinders are provided; and a portion of said dewatering cylinders being located within the wire loop of the wire and a remaining portion thereof being located externally of the wire loop of the wire.

8. A wire machine for dewatering stock suspensions, comprising:

at least three dewatering cylinders;

said at least three dewatering cylinders being located out-of-line;

an endless revolving wire defining an endless wire loop;

said endless revolving wire defining a common wire trained about said at least three dewatering cylinders;

each said dewatering cylinder and said wire coacting with one another so as to form therebetween a respective substantially wedge-shaped space;

at least one respective infeed device located within said wire loop and cooperating with an associated one of said dewatering cylinders for infeeding a substantially flat stock jet of the material which is to be dewatered into said substantially wedge-shaped space between said wire and said associated dewatering cylinder;

at least one respective removal device cooperating with an associated one of said dewatering cylinders for the removal of dewatered material adhering to the surface of the associated dewatering cylinder;

each said dewatering cylinder having a lengthwise axis which is substantially vertically arranged;

said endless revolving wire having a wire surface which is likewise substantially vertically arranged;

the dewatered material removed by each said removal device being removed under the action of the force of gravity downwardly out of the region of the endless revolving wire and said dewatering cylinders;

said infeed devices and removal devices being arranged at predetermined regions between said dewatering cylinders; and at least two of said three dewatering cylinders are located within said common wire.

9. A wire machine for dewatering stock suspensions, comprising:

at least three dewatering cylinders;

said at least three dewatering cylinders being located out-of-line;

an endless revolving wire defining an endless wire loop;

said endless revolving wire defining a common wire trained about said at least three dewatering cylinders;

each said dewatering cylinder and said wire coacting with one another so as to form therebetween a respective substantially wedge-shaped space;

at least one respective infeed device located within said wire loop and cooperating with an associated one of said dewatering cylinders for infeeding a substantially flat stock jet of the material which is to be dewatered into said substantially wedge-shaped space between said wire and said associated dewatering cylinder;

at least one respective removal device cooperating with an associated one of said dewatering cylinders for the removal of dewatered material adhering to the surface of the associated dewatering cylinder;

each said dewatering cylinder having a lengthwise axis which is substantially vertically arranged;

said endless revolving wire having a wire surface which is likewise substantially vertically arranged;

the dewatered material removed by each said removal device being removed under the action of the force of gravity downwardly out of the region of the endless revolving wire and said dewatering cylinders;

a portion of said dewatering cylinders being located within the wire loop of the endless revolving wire and a remaining portion thereof being located externally of the wire loop of the endless revolving wire; and at least two of said three dewatering cylinders are located within said endless wire loop.

* * * * *